April 16, 1963     G. O. JOHNSON     3,085,824
FISH GAFF
Filed March 2, 1961     2 Sheets-Sheet 1
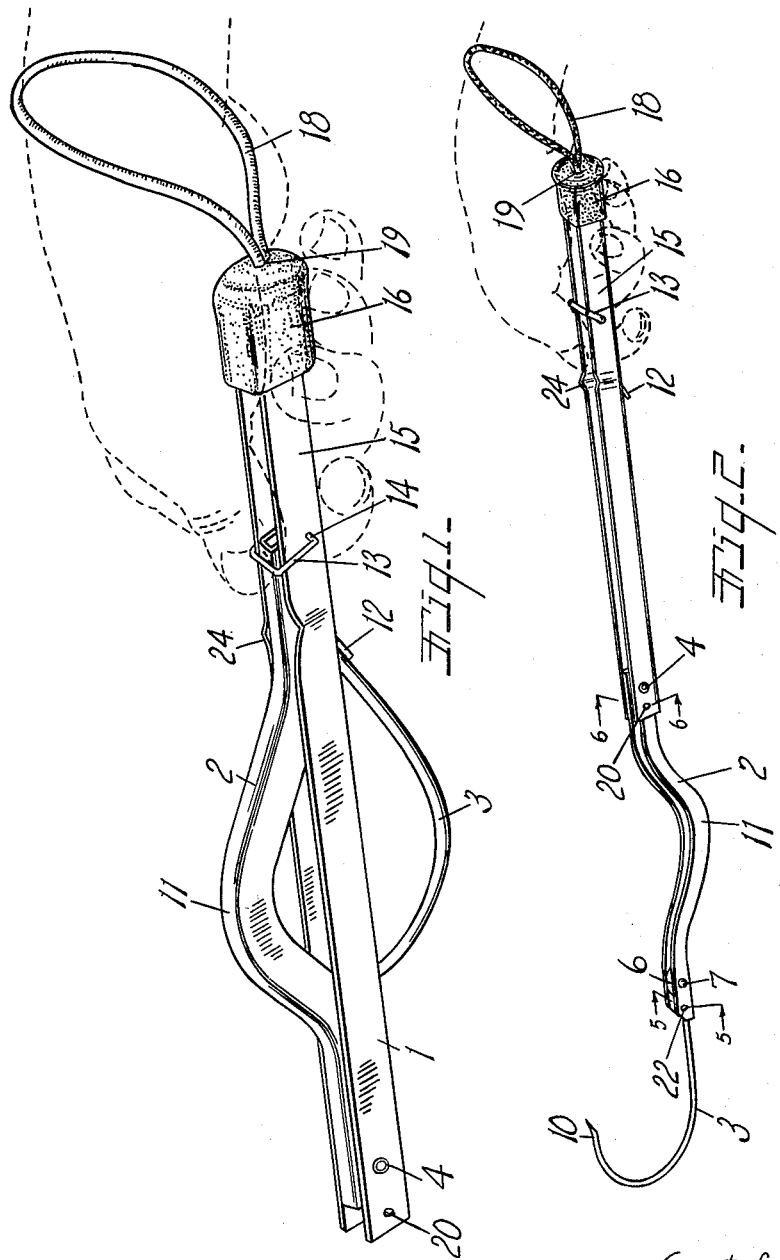
INVENTOR.
Gustof O. Johnson
BY
ATTORNEY April 16, 1963 G. O. JOHNSON 3,085,824
FISH GAFF
Filed March 2, 1961 2 Sheets-Sheet 2
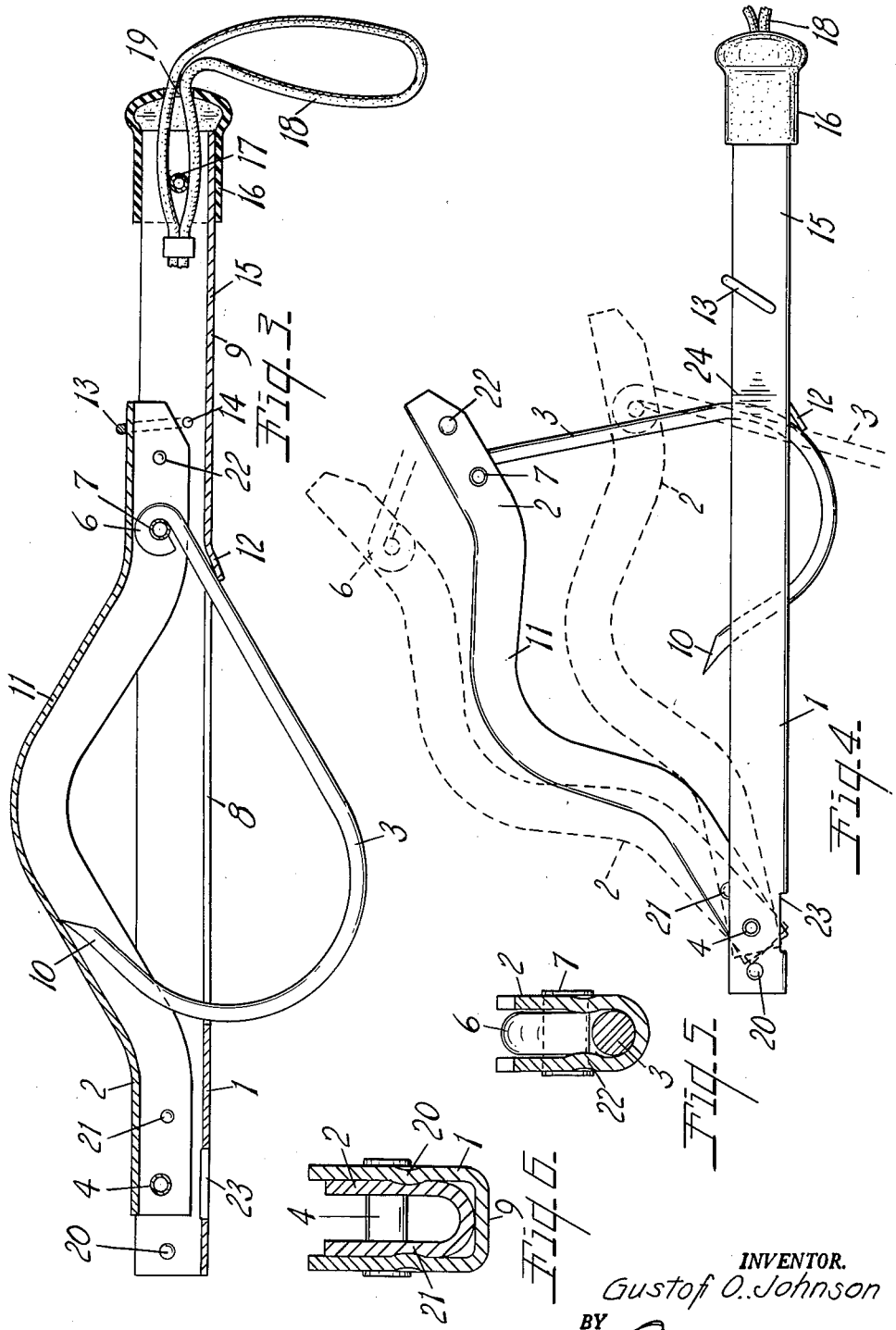
INVENTOR.
Gustof O. Johnson
BY
ATTORNEY.

United States Patent Office 3,085,824
Patented Apr. 16, 1963

3,085,824
FISH GAFF
Gustof O. Johnson, 149 Larson Ave., Elkhart, Ind.
Filed Mar. 2, 1961, Ser. No. 92,818
6 Claims. (Cl. 294—26)

This invention relates to a fish gaff. The main objects of the invention are,

First, to provide a collapsible fish gaff including a hook which is relatively compact when in collapsed position and may be quickly extended for use merely by swinging movement.

Second, to provide a fish gaff having these advantages in which when in collapsed position the point or tip portion of the hook is effectively housed and guarded.

Third, to provide a fish gaff having these advantages which is relatively light in weight and is provided with an arm engaging hanger which in no wise conflicts with the manipulation of the gaff and prevents accidental dropping thereof.

Objects relating to details and economies of the invention will appear from the description to follow. The invent is defined and pointed out in the claims.

A preferred embodiment of the invention is illustrated in the accompanying drawing, in which:

FIG. 1 is a perspective view of a gaff embodying my invention with the parts in collapsed position, the hand of an operator being illustrated by dotted lines in grasping position.

FIG. 2 is a fragmentary perspective view with the gaff in extended position.

FIG. 3 is a longitudinal sectional view of the gaff in collapsed position, the hook and arm receiving loop being illustrated in full lines.

FIG. 4 is a side elevational view illustrating the gaff in one partially open position by full lines, and in other positions by dotted lines.

FIG. 5 is an enlarged sectional view on a line corresponding to line 5—5 of FIG. 2.

FIG. 6 is an enlarged fragmentary view on a line corresponding to line 6—6 of FIG. 2.

The embodiment of my invention illustrated comprises the elongated body member 1 of upwardly facing channel section which may desirably be formed of a strip of aluminum or other light metal. The hook support member 2 is likewise of channel cross section and is also desirably formed of light metal stock. The gaff hook 3 is desirably formed of steel wire. The hook support member 2 is dimensioned so that it fits between and is pivoted thereto at 4. The eye 6 of the hook 3 is disposed between the side flanges of the hook support member 2 and is pivoted thereto in spaced relation to its outer end by the pivot 7. The gaff hook is of such dimensions that it is supported against substantial lateral movement on its pivot by the side of the hook support member.

With the parts thus pivotally connected, they may be adjusted to collapsed position as shown in FIGS. 1 and 3, or adjusted to extended position as is shown in FIG. 2. When in collapsed position the major portions of the hooks 3 project through the slot 8 in the web portion 9 of the body member, with the tip 10 of the hook projecting into the offset 11 in the hook support member, see FIG. 3. In this position, the point or tip of the hook is effectively guarded or housed. At the inner end of the slot 8, the body member is provided with a rearwardly projecting inclined tongue 12 with which the hook engages as the gaff is collapsed, see FIGS. 3 and 4, and which serves to minimize friction between these engaging parts, although these tongues 12 are not essential from the operating standpoint.

The hook support member is releasably held in collapsed position by the loop-like latch 13 which has inturned pivots 14 pivotally engaging the flanges of the body member. The portion of the body member at the inner side of this latch 13, designated by the numeral 15, constitutes a grip or hand hold.

In the embodiment illustrated, the body member is provided with a nonmetallic cap 16 on the inner end thereof to cover the end of the body and the rivet 17. This cap constitutes a part of the grip, as is indicated by dotted lines in FIGS. 1 and 2. In the preferred embodiment illustrated, the arm receiving loop 18, which is desirably of resilient material, is disposed through an opening 19 in the outer end of the cap 16 to retainingly engage the rivet 17, see FIG. 3. In use the loop 18 is slipped over the hand of the operator to engage his wrist, as is illustrated. The main purpose, however, of this loop is that the gaff be supported in convenient position for use and also to prevent loss.

In the embodiment illustrated, the hook support member is releasably retained in its extended position by means of the detents 20 which engage keeper-like portions 21 provided therefor and coacting therewith in the support member, see FIG. 6. The hook support member is provided with a detent 22 which retainingly engages the shank of the hook when it is in its extended position. In the embodiment illustrated, the web of the body member is provided with a slot 23 aligned with the pivot 4 and through which the edge of the hook support member swings as it is adjusted from collapsed to open position, and vice versa, see FIGS. 3 and 4.

The outward offsets 24 in the body member are merely for the purpose of providing space or clearance for the ends of the pivot 6. It is desirable, as stated, that the parts are dimensioned so that there is a relatively close fit when they are in collapsed position.

With the parts thus arranged in use, the user grasps the grip portion, releases the latch 13 which may be done with the finger of the hand grasping the gaff, see FIGS. 1 and 2, and a swinging action, desirably somewhat snap-like, is given to the body member which results in the swinging of both the hook support member and the hook to their extended use position, as shown in FIG. 2. They are releasably held in that position by the detents which have been described. In collapsing, the hook may be swung inwardly by hand or by contacting with an object such as a floor, wall or some portion of a boat, and the same may be done with the hook support member when it is swung to collapsed position in which the hook is automatically extended through the slot 8 and completely collapsed with its tip housed within the support member. The latch 13 may then be engaged with the collapsed hook support member. When collapsed, the gaff is compact and there is no possibility of its opening without the disengagement of the latch 13 which has a springably yielding snap-on engagement with the holder member.

It is desired to point out that the parts of the applicant's gaff are so arranged that they may be formed of relatively light stock and at the same time are capable of withstanding quite heavy stresses. The fact that the body member and the hook support member are of channel cross section not only tends to that end, but there is an important functioning relation resulting from this feature.

I have illustrated and described my invention in a highly practical embodiment thereof. I have not illustrated other modifications or adaptations, as it is believed that this disclosure will enable those skilled in the art to embody or adapt my invention as may be desired.

Having thus described the invention, what is claimed as new and desired to secure by Letters Patent is:

1. A gaff comprising an enlongated body member of channel section and having a grip portion at its inner end, a hook support member of channel cross section pivotally mounted on said body member to be extended therefrom or to be collapsed therein, a hook pivotally mounted on said hook support member to be extended outwardly therefrom in supported relation thereto or to be collapsed inwardly thereof, said hook support member having an intermediate portion adapted to receive the tip portion of the hook when the hook is in collapsed position, said body member having a slot in the web thereof through which a portion of the shank of said hook projects when said hook support member is in its collapsed position, and a springably engageable latch adjustably mounted on said body member for engagement with said hook support member when it is in its collapsed position, said latch being positioned to be manipulated by the gaff user while grasping said grip portion of said body member.

2. A gaff comprising an elongated body member of channel section and having a grip portion at its inner end, a hook support member of channel cross section pivotally mounted on said body member to be extended therefrom or to be collapsed therein, a hook pivotally mounted on said hook support member to be extended outwardly therefrom in supported relation thereto or to be collapsed inwardly thereof, said hook support member having an intermediate portion adapted to receive the tip portion of the hook when the hook is in collapsed position, said body member having a slot in the web thereof through which a portion of the shank of said hook projects when said hook support member is in its collapsed position, said hook support member being provided with a springably yieldable detent portion acting to hold said hook in its extended position, said body member being provided with a springably yieldable detent acting to hold said hook support member in its extended position.

3. A gaff comprising an elongated body member of channel section and having a grip portion at its inner end, a hook support member of channel cross section pivotally mounted on said body member to be extended therefrom or to be collapsed therein, a hook pivotally mounted on said hook support member to be extended outwardly therefrom in supported relation thereto or to be collapsed inwardly thereof, said hook support member having an intermediate portion adapted to receive the tip portion of the hook when the hook is in collapsed position, said body member having a slot in the web thereof through which a portion of the shank of said hook projects when said hook support member is in its collapsed position.

4. A gaff comprising an elongated body member of channel section having a grip portion at its inner end, a hook support member pivotally mounted on said body member at the outer end thereof to be collapsed inwardly thereof, a hook pivotally mounted on said support member to be extended outwardly therefrom in supported relation thereto or to be collapsed inwardly thereof, said hook being retainingly supported by and between said body member and said support member when the hook and support member are in collapsed position with the tip of the hook within and guarded by said hook support member and with the hook in supported engagement with the body member, said body member having an opening therein through which the major portion of the shank of the hook intermediate its tip and its connection to said hook support member projects when the parts are in collapsed position.

5. A gaff comprising a body member of channel section and having a grip portion at its inner end, a cap sleeved upon the inner end of said body member and constituting a grip element and having an arm receiving loop extending therefrom, a hook support member pivotally mounted on said body member to be collapsed thereon or to be swung outwardly into alignment with and constituting an extension of said body member, and a hook pivotally mounted on said hook support member to be extended outwardly therefrom in supported relation thereto or to be collapsed inwardly thereof with its tip guardedly disposed within said hook support member, said hook support member with said hook collapsed thereon being collapsible on said body member, said body member having an opening therein through which the shank portion of said hook projects when parts are in collapsed position and having a stop at the inner end of the opening coacting with the shank of the hook.

6. A gaff comprising a body member of channel section and having a grip portion at its inner end, a hook support member pivotally mounted on said body member to be collapsed thereon or to be swung outwardly into alignment with and constituting an extension of said body member, and a hook pivotally mounted on said hook support member to be extended outwardly therefrom in supported relation thereto or to be collapsed inwardly thereof with its tip guardedly disposed within said hook support member, said hook support member with said hook collapsed thereon being collapsible on said body member, said body member having an opening therein through which the shank portion of said hook projects when parts are in collapsed position and having a stop at the inner end of the opening coacting with the shank of the hook.

References Cited in the file of this patent

UNITED STATES PATENTS

| | | |
|---|---|---|
| 2,600,510 | Lisignoli | June 17, 1952 |
| 2,679,429 | Martin | May 25, 1954 |
| 2,978,269 | Karlsson | Apr. 4, 1961 |

FOREIGN PATENTS

| | | |
|---|---|---|
| 210,311 | Great Britain | Jan. 31, 1924 |
| 134,839 | Sweden | Mar. 11, 1952 |